US012762492B2

(12) United States Patent
Zhang

(10) Patent No.: US 12,762,492 B2
(45) Date of Patent: Oct. 13, 2026

(54) METHOD FOR SEAMLESS CONNECTION OF FUNCTIONAL TOOLS TO PUBLISH A BUSINESS INTELLIGENCE DASHBOARD

(71) Applicant: T-Mobile USA, Inc., Bellevue, WA (US)

(72) Inventor: Garret Zhang, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 259 days.

(21) Appl. No.: 18/428,806

(22) Filed: Jan. 31, 2024

(65) Prior Publication Data

US 2025/0245595 A1 Jul. 31, 2025

(51) Int. Cl.

*G06F 40/00* (2020.01)
*G06F 40/18* (2020.01)
*G06F 40/186* (2020.01)
*G06Q 10/0633* (2023.01)
*G06Q 10/107* (2023.01)

(52) U.S. Cl.

CPC ......... *G06Q 10/0633* (2013.01); *G06F 40/18* (2020.01); *G06F 40/186* (2020.01); *G06Q 10/107* (2013.01)

(58) Field of Classification Search

CPC ................................ G06Q 10/00; G06F 40/00
USPC ......................................................... 705/7.27
See application file for complete search history.

(56) References Cited

U.S. PATENT DOCUMENTS

| | | | | |
|---|---|---|---|---|
| 6,920,631 | B2 | 7/2005 | Delo | |
| 7,694,308 | B1 | 4/2010 | Dickson et al. | |
| 7,880,749 | B2 | 2/2011 | Favart et al. | |
| 7,975,254 | B2 | 7/2011 | Gilboa | |
| 8,316,314 | B2 | 11/2012 | Wirch et al. | |
| 8,959,477 | B2 | 2/2015 | Mueller | |
| 9,905,034 | B2 | 2/2018 | Prophete et al. | |
| 11,281,521 | B1 * | 3/2022 | Petkar | G06F 11/0751 |
| 11,687,559 | B1 * | 6/2023 | Padwad | G06F 16/1794 707/610 |
| 11,830,605 | B2 | 11/2023 | Gotman et al. | |
| 2002/0016771 | A1 | 2/2002 | Carothers et al. | |
| 2003/0051236 | A1 | 3/2003 | Pace et al. | |
| 2004/0205727 | A1 * | 10/2004 | Sit | G06F 11/3698 717/125 |
| 2006/0112123 | A1 | 5/2006 | Clark et al. | |
| 2010/0211895 | A1 | 8/2010 | Mistry et al. | |
| 2012/0011077 | A1 | 1/2012 | Bhagat | |
| 2014/0173401 | A1 * | 6/2014 | Oshlag | G06F 40/18 715/212 |

(Continued)

FOREIGN PATENT DOCUMENTS

| | | | |
|---|---|---|---|
| WO | 2015103698 | A1 | 7/2015 |
| WO | 2015185328 | A1 | 12/2015 |

*Primary Examiner* — Mustafa Iqbal

(74) *Attorney, Agent, or Firm* — Ashurst Perkins Coie US LLP

(57) ABSTRACT

A method for publishing a Business Intelligence (BI) dashboard regarding the status of a telecommunications network project that comprises querying a software defect-tracking tool regarding the status of a software defect, exporting the result to a spreadsheet, processing the result to generate a table, a chart, a graph, or any combination thereof, inserting the processed result into a slide template, publishing the dashboard to a storage location, including the dashboard as an attachment in an email, and sending the email to at least one recipient.

17 Claims, 5 Drawing Sheets

(56) References Cited

U.S. PATENT DOCUMENTS

| | | | | |
|---|---|---|---|---|
| 2014/0181793 | A1 | 6/2014 | Kaliappan | |
| 2015/0143248 | A1* | 5/2015 | Beechuk | G06F 3/0482<br>715/739 |
| 2018/0091647 | A1* | 3/2018 | Elizondo | H04M 3/5175 |
| 2019/0155577 | A1* | 5/2019 | Prabha | G06Q 10/0635 |
| 2020/0175195 | A1* | 6/2020 | Nomura | G06F 21/6245 |

* cited by examiner

METHOD FOR SEAMLESS CONNECTION OF FUNCTIONAL TOOLS TO PUBLISH A BUSINESS INTELLIGENCE DASHBOARD

BACKGROUND

Business intelligence (BI) comprises the strategies and technologies used by enterprises for the data analysis and management of business information. Common functions of business intelligence technologies include reporting, online analytical processing, analytics, dashboard development, data mining, process mining, complex event processing, business performance management, benchmarking, text mining, predictive analytics, and prescriptive analytics. BI tools can handle large amounts of structured and sometimes unstructured data to help identify, develop, and otherwise create new strategic business opportunities. Combining external and internal data can provide a complete picture which, in effect, creates an "intelligence" that cannot be derived from any singular set of data.

BRIEF DESCRIPTION OF THE DRAWINGS

Detailed descriptions of implementations of the present invention will be described and explained through the use of the accompanying drawings.

Figure 1:
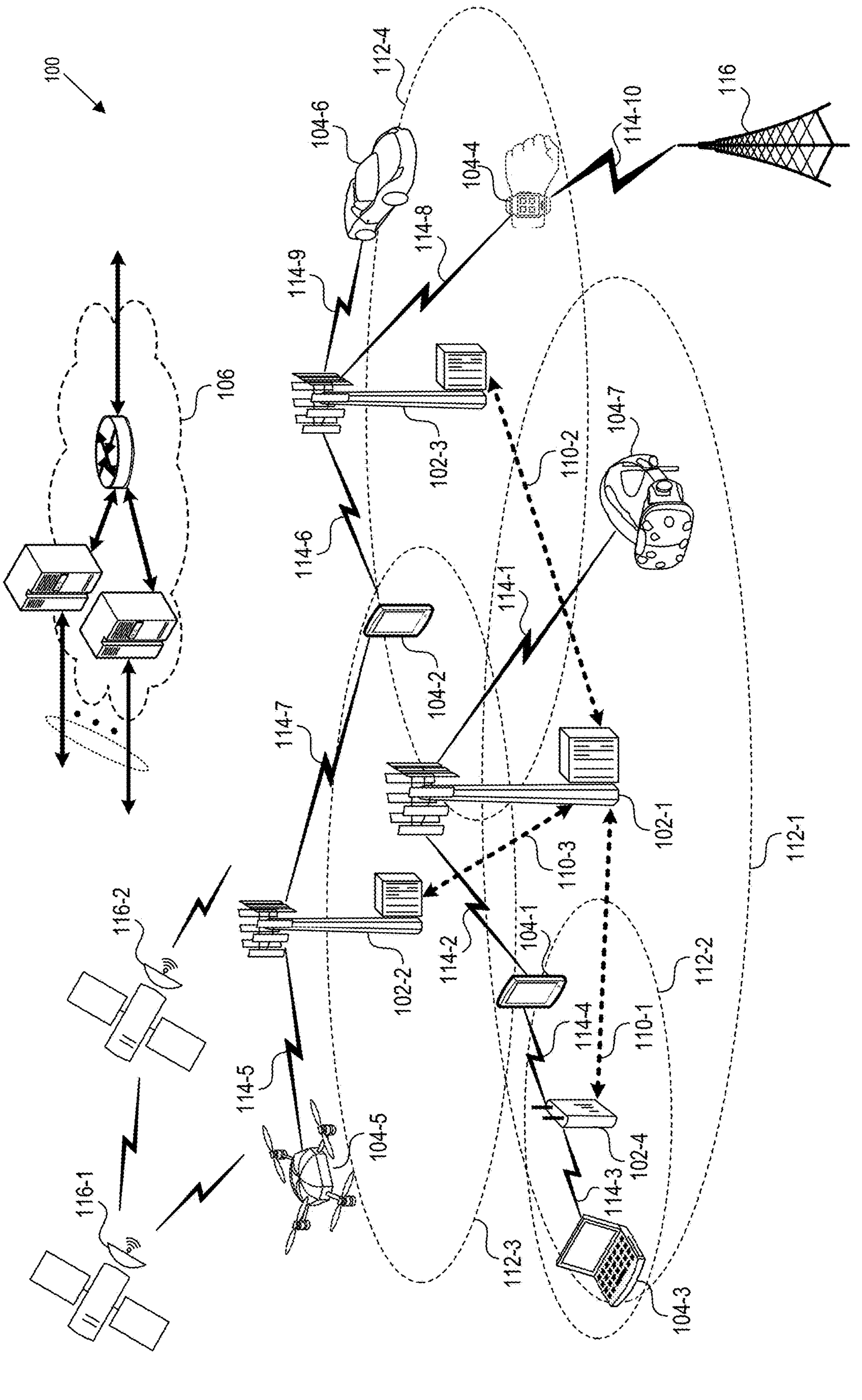
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a method and system for creating and publishing a comprehensive business intelligence report of a telecommunications system by seamlessly combining data from disparate functional tools. A service provider of a telecommunications network uses a variety of business intelligence, bug tracking, and project management tools to track progress of various projects. The service provider can also use spreadsheets, word processing, and slide presentation tools to create complex dashboards and communicate the dashboards to internal and external teams using email software. Each tool produces a unique type of information and in a unique format. The present technology produces a multi-slide business intelligence presentation where each slide contains a dashboard indicating the progress, status, or trend of a project related to the telecommunications network. Further, the technology also performs a predictive analysis of the business intelligence data to make a prediction about a future status of a project.

In business computer information systems, a dashboard is a type of graphical user interface that often provides at-a-glance views of key performance indicators (KPIs) relevant to a particular objective or business process. In other usage, "dashboard" is another name for "progress report" or "report" and considered a form of data visualization. In providing this overview, business owners can save time and improve their decision making by utilizing dashboards. In computer programming, a macro (short for "macro instruction") is a rule or pattern that specifies how a certain input should be mapped to a replacement output. Macros are used to make a sequence of computing instructions available to the programmer as a single program statement, making the programming task less tedious and less error-prone. Visual Basic for Applications (VBA) is an implementation of Microsoft's event-driven programming language Visual Basic 6.0, which is built into most desktop Microsoft Office applications. A scripting language or script language is a programming language that is used to manipulate, customize, and automate the facilities of an existing system.

In one implementation of the technology, the system can include a computer script to query at least one database of a software defect-tracking tool and export a result of the query as data into a spreadsheet. In one implementation, the computer script can be a Python script. The software defect-tracking tool can be JIRA and the query can be run using JIRA Query Language (JQL). The amount of data exported from the software defect-tracking tool can be configurable. The computer script can execute multiple loops recursively to export data in subsets. In one implementation, the subset of data exported in a single loop can be between 50 and 10,000 rows long. In another implementation, the number of rows of data to be exported can be configured by an operator of the script. In yet another implementation, the subset of data exported in a single loop can be any fraction greater than 0 and less than or equal to 1 of the total number of rows to be exported. The data exported into a spreadsheet can be further manipulated using at least one VBA macro, at least one spreadsheet formula, at least one computer script, or any combination thereof. In one implementation, the VBA macro can be a computer script. The at least one VBA that manipulates data exported into the spreadsheet can be a Data Manipulation and Chart Design VBA. In one implementation, the Data Manipulation and Chart Design VBA can be a computer script. Data exported by the computer script on a particular day can be compared with data exported by the computer script on a different day to show a trend in the data. The manipulated data can include at least one graph, at least one chart, at least one table, or any combination thereof. The computer script can be configured to retain data exported by the script on a previous day without being overwritten by data exported by the computer script on the latest day when the computer script is run. The computer script can be configured to run no more than once in a day.

In one implementation, the disclosed technology can be implemented to create a software defect burndown chart by performing predictive analysis on previously resolved software defects to predict when an unresolved software defect may be resolved. In one implementation, performing the predictive analysis comprises exporting information from JIRA using at least one JQL query, calculating a total number of software defects as a starting point of a burndown prediction, calculating an average number of resolved software defects in at least one prior month as a burndown from the starting point, adding a number of new software defects created to the total of unresolved software defects, representing the actual burndown in a chart and compare it with a prediction, and adjusting the prediction based on a difference between actual and predictive burndown to further improve accuracy of the prediction. Adjusting the burndown prediction can further comprise analyzing an average number of resolved software defects per month to identify edge cases that skew the data. The edge cases can comprise duplicate software defects that result in an increase of the average, resolving software defects that remain unresolved for at least one year, adjusting the average based on a number of software developers assigned to work on the software defects, and accounting for holidays and paid time off taken by software developers.

The system can include at least one VBA macro to copy the at least one graph, the at least one chart, the at least one table, or any combination thereof into at least one slide. The at least one VBA macro that copies the at least one graph, the at least one chart, the at least one table, or any combination thereof into at least one slide can be a PowerPoint VBA. In one implementation, the PowerPoint VBA can be a computer script. The system can further include at least one VBA macro to create an email and include the at least one slide as an attachment. The at least one VBA macro to create an email and include the at least one slide as an attachment can be an Outlook Email VBA. In one implementation, the Outlook Email VBA can be a computer script. The system can add a subject line to the email corresponding to the date the computer script is run. The system can send the email to a configurable list of recipients. In one implementation, the system can convert the information contained in the at least one slide into a HyperText Markup Language (HTML) format and include it in the body of the email. The system can include at least one VBA macro to further save a copy of the at least one slide onto a network location. The at least one VBA macro that saves a copy of the at least one slide onto a network location can be a Publish to SharePoint VBA. In one implementation, the Publish to SharePoint VBA can be a computer script.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
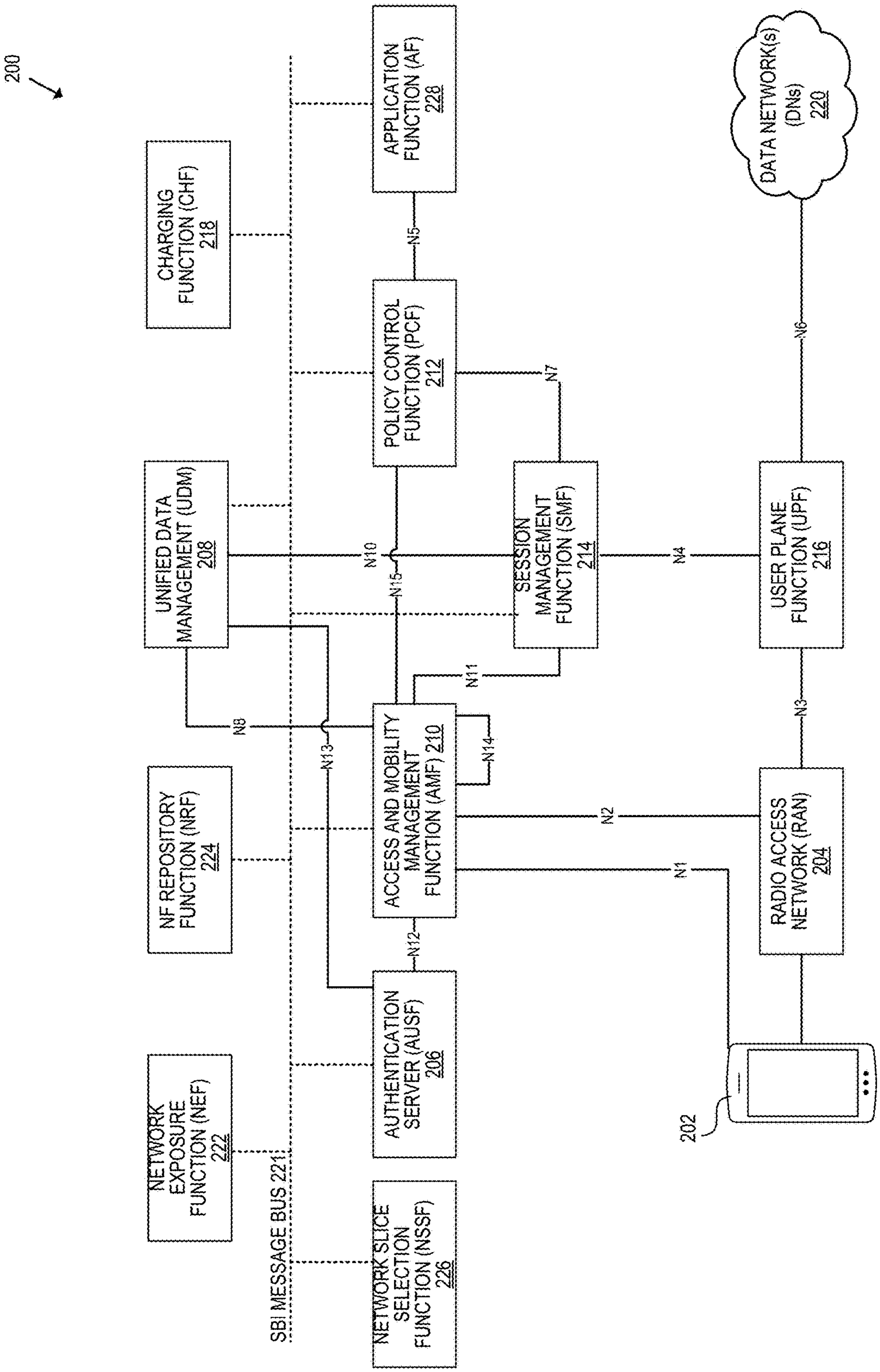
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
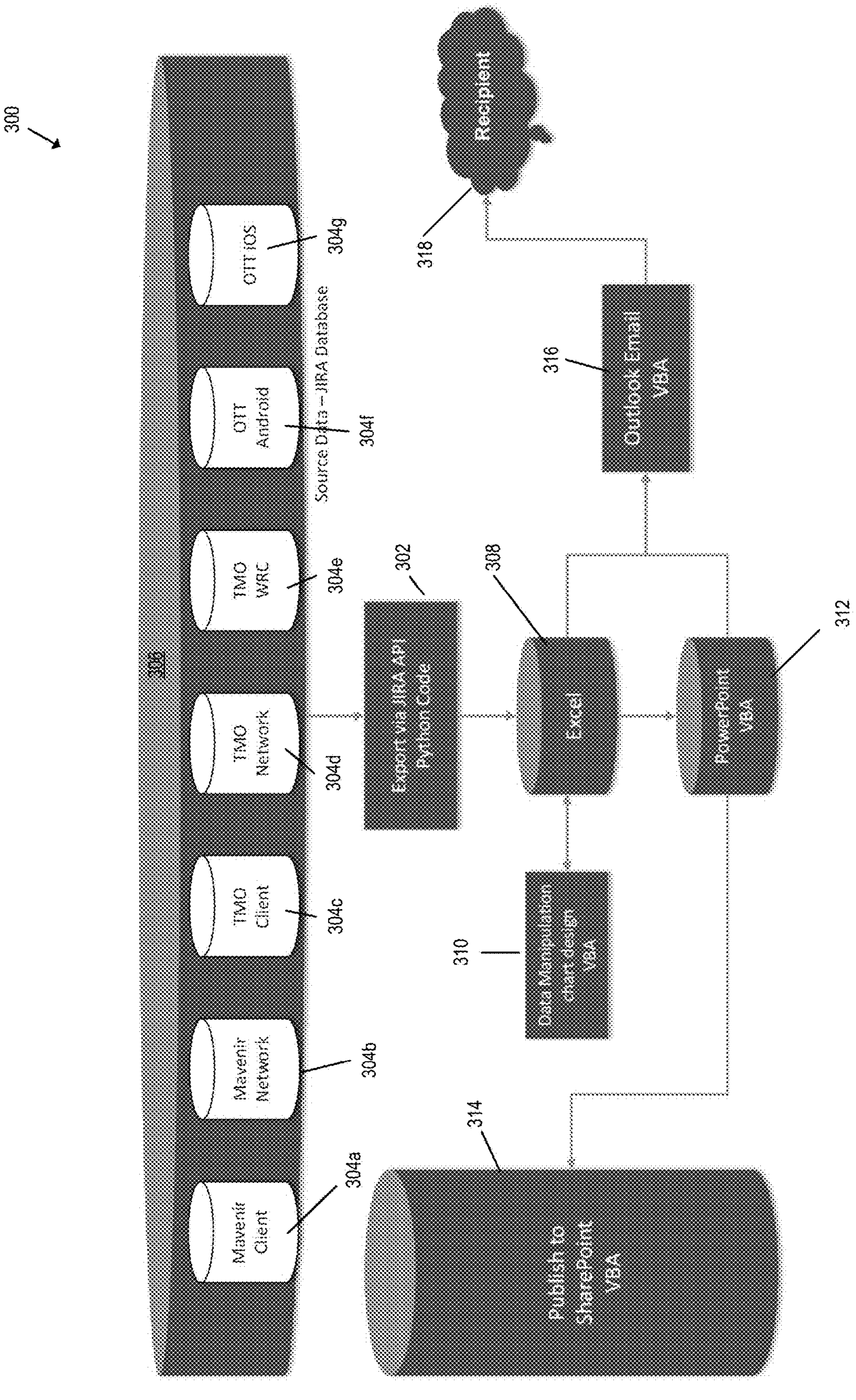
FIG. 3 is a block diagram that illustrates a system to publish a Business Intelligence dashboard that can implement aspects of the present technology.

System for Connecting Functional Tools to Publish a Business Intelligence Dashboard FIG. 3 is a block diagram that illustrates a system 300 to publish a Business Intelligence (BI) dashboard that can implement aspects of the present technology. The system 300 can include a computer script 302 that is configured to query databases 304*a* through 304*g* (referred to individually as "database 304" or collectively as "databases 304") of a software defect-tracking tool 306. The computer script 302 can be written in Python programming language. The software defect-tracking tool 306 can be JIRA. The computer script 302 can query the software defect-tracking tool 306 using JIRA Query Language (JQL). The computer script 302 can export a result of the query to a spreadsheet 308. The spreadsheet 308 can be a Microsoft Excel spreadsheet. The computer script 302 can be configured to export subsets of the result of the query recursively in a loop. A Data Manipulation Chart Design Visual Basic Application (VBA) 310 can generate at least one chart, at least one graph, at least one table, or any combination thereof by processing the data exported by the computer script 302 to the spreadsheet 308. A PowerPoint VBA 312 can create a slide presentation and insert the chart, graph, table, or any combination thereof created by the Data Manipulation Chart Design VBA 310 into at least one slide. The slide presentation can be a Microsoft PowerPoint presentation. Each slide in the presentation is a dashboard that indicates a status of a project of the telecommunications network. A Publish to SharePoint VBA 314 can store the slide presentation created by the PowerPoint VBA 312 onto a non-transitory, computer-readable storage medium. The non-transitory, computer-readable storage medium can be a cloud storage location. An Outlook Email VBA 316 can compose an email based on an email template, include at least one slide as an attachment in the email, and send the email to at least one recipient 318. The email can be composed using Microsoft Outlook.

Figure 4:
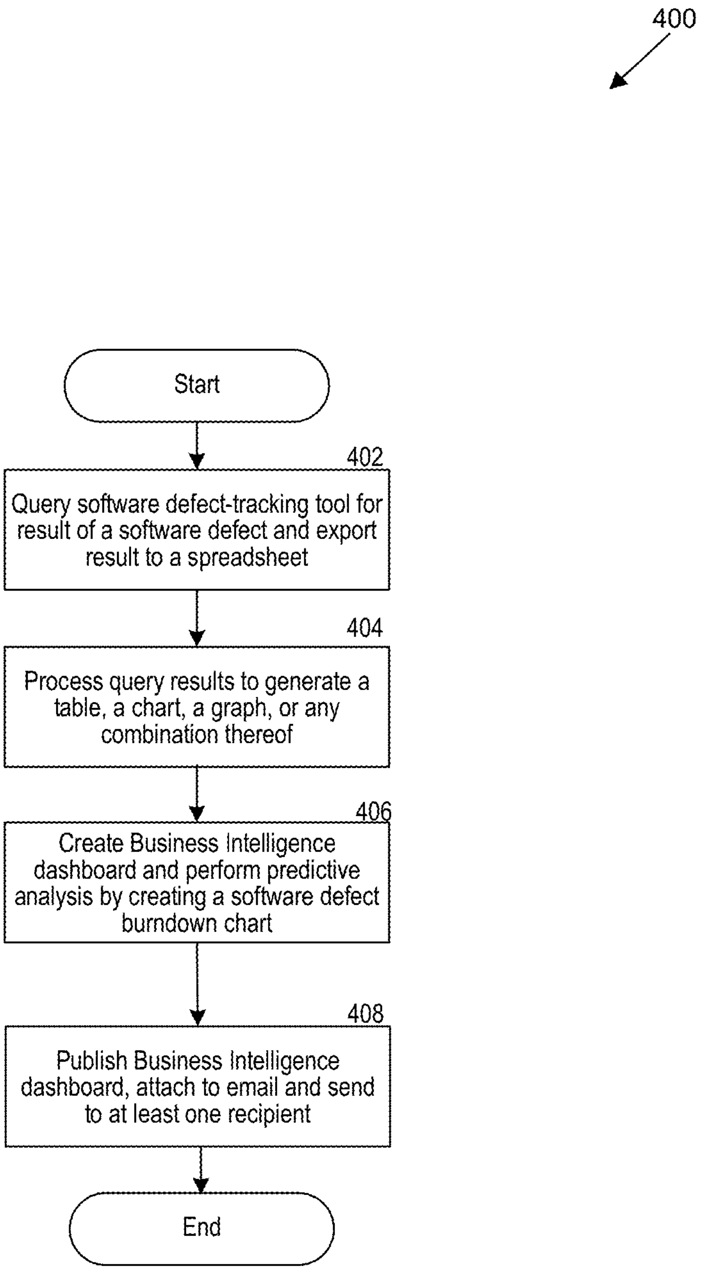
FIG. 4 is a flowchart of a method to implement at least some aspects of the present technology.

FIG. 4 is a flowchart of a method to implement aspects of the present technology to publish a BI dashboard regarding the status of a project of a telecommunications network. The process 400 is performed by a system of a telecommunications network that includes at least one hardware processor and at least one non-transitory memory storing instructions thereon. The instructions, when executed, can cause publishing of a BI dashboard that includes a status of a project of a service provider of a telecommunications network.

At 402, the system can initiate a first computer script stored in a non-transitory, computer-readable storage medium. The first computer script can be configured to query at least one database of a software defect-tracking tool regarding a status of a software defect and export a result of the query to a spreadsheet. The software defect-tracking tool can be JIRA. The first computer script can be configured to query the software defect-tracking tool in JQL. Optionally, the first computer script can be configured to query the software defect-tracking tool in at least one recursive loop such that within the at least one recursive loop a unique subset of the result of the query can be exported to the spreadsheet. Optionally, the unique subset of the result can be any number within a range of 50 to 10,000 rows, both numbers inclusive. Further, the first computer script can be configured to include at least one date check to prevent the first computer script from running more than once in a day.

At 404, the system can process, using at least one spreadsheet formula, a first VBA macro, a second computer script, or any combination thereof, the result of the query exported to the spreadsheet. The processing can include representing the result as at least one table, at least one chart, at least one graph, or any combination thereof.

At 406, the system can create at least one BI dashboard by initiating at least a second VBA macro stored in a non-transitory, computer-readable storage medium. The second VBA macro can be configured to open a template of a slide presentation and enter the at least one table, at least one chart, at least one graph, or any combination thereof into at least one slide of the presentation. Optionally, the second VBA macro can be configured to predict a future status of a project of the telecommunications network by performing a predictive analysis. Performing the predictive analysis can comprise creating a software defect burndown chart. Creating the software defect burndown chart can comprise calculating a rate at which software defects were resolved in at least one preceding month and dividing a sum of a count of remaining software defects and a count of new software defects created in the current month by the calculated rate. The second VBA macro can be further configured to initiate at least a third VBA macro. The third VBA macro can be configured to save the at least one BI dashboard to a non-transitory, computer-readable storage medium. Optionally, the third VBA macro can store the at least one BI dashboard in a cloud storage location.

At 408, the system can publish the at least one BI dashboard by initiating a fourth VBA macro. The fourth VBA macro can be configured to compose at least one email based on an email template, include the at least one BI dashboard as at least one attachment in the email, and send the email to at least one recipient. Optionally, publishing the at least one BI dashboard can further comprise converting, by the fourth VBA macro, the at least one BI dashboard into a HyperText Markup Language (HTML) format and including the at least one BI dashboard in a main body of the email.

Computer System

Figure 5:
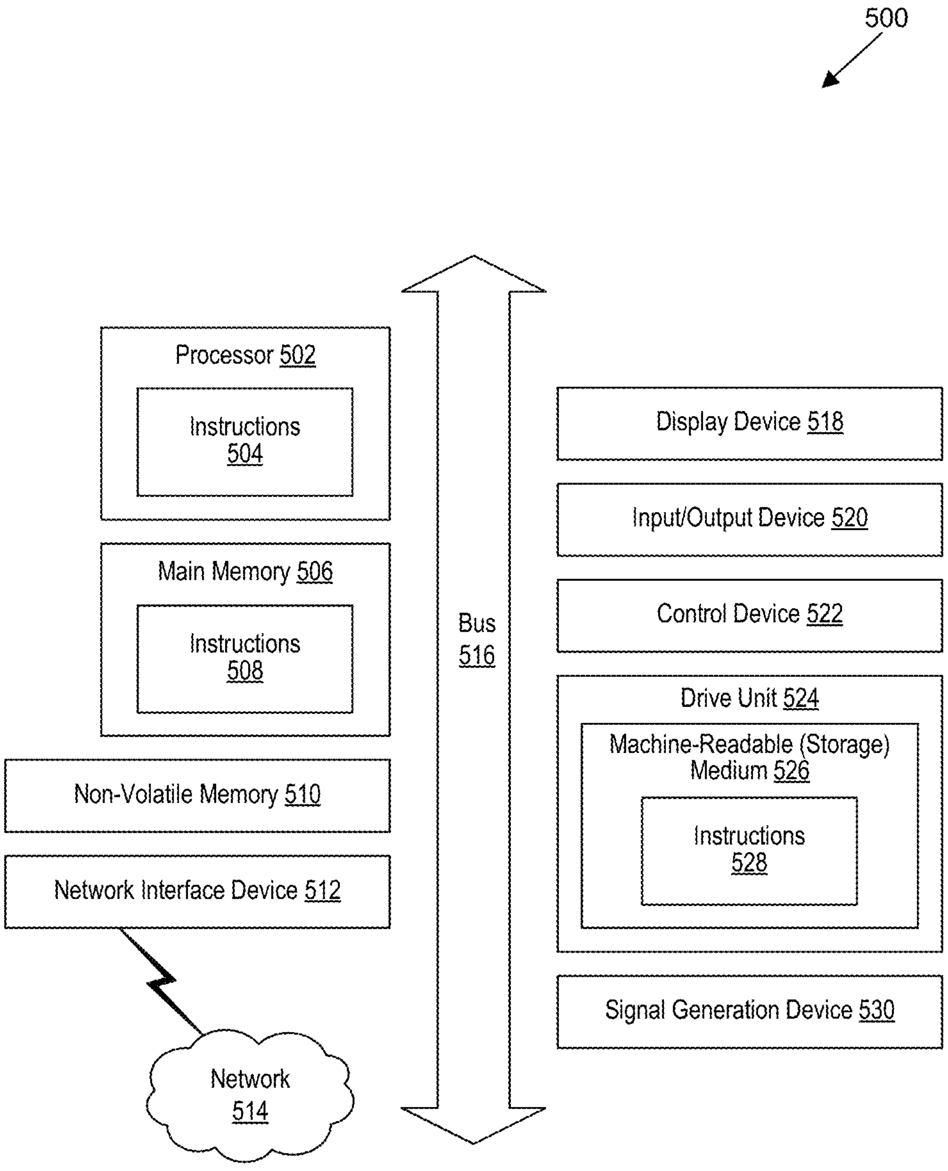
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A method for publishing a Business Intelligence (BI) dashboard that includes a status of a project of a service provider of a telecommunications network, the method comprising:

initiating a first computer script stored in a non-transitory, computer-readable storage medium, wherein the first computer script is configured to query at least one database of a software defect-tracking tool regarding a status of a software defect, and wherein the first computer script is configured to export a result of the query to a spreadsheet;

processing, using at least one spreadsheet formula, a first Visual Basic Application (VBA) macro, a second computer script, or any combination thereof, the result of the query exported to the spreadsheet, wherein processing the result of the query exported to the spreadsheet includes representing the result as at least one table, at least one chart, at least one graph, or any combination thereof;

creating at least one BI dashboard, wherein creating the at least one BI dashboard comprises initiating at least a second VBA macro stored in a non-transitory, computer-readable storage medium, wherein the at least a second VBA macro is configured to open a template of a slide presentation and enter the at least one table, at least one chart, at least one graph, or any combination thereof into at least one slide of the presentation, wherein the at least a second VBA macro is configured to predict a future status of a project of the telecommunications network by performing a predictive analysis, wherein performing the predictive analysis comprises creating a software defect burndown chart, wherein creating the software defect burndown chart comprises calculating a rate at which software defects were resolved in at least one preceding month and dividing a sum of a count of remaining software defects and a count of new software defects created in a current month by the calculated rate, wherein the at least a second VBA macro is configured to initiate at least a third VBA macro, and wherein the at least a third VBA macro is configured to save the at least one BI dashboard to a non-transitory, computer-readable storage medium;

publishing the at least one BI dashboard, wherein publishing the at least one BI dashboard comprises initiating at least a fourth VBA macro, wherein the at least a fourth VBA macro is configured to compose at least one email based on an email template and include the at least one BI dashboard as at least one attachment in the email, and wherein the at least a fourth VBA macro is configured to send the email to at least one recipient.

2. The method of claim 1, wherein the software defect-tracking tool is JIRA and wherein the first computer script is configured to query the software defect-tracking tool in JIRA Query Language (JQL).

3. The method of claim 1, wherein the first computer script is configured to query the software defect-tracking tool in at least one recursive loop, wherein, within the at least one recursive loop, a unique subset of the result of the query is exported to the spreadsheet, and wherein the unique subset of the result is 50 to 10,000 rows long.

4. The method of claim 1, wherein the first computer script is configured to include at least one date check to prevent the first computer script from running more than once in a day.

5. The method of claim 1, wherein publishing the at least one BI dashboard further comprises, converting, by the at least a fourth VBA macro, the at least one BI dashboard into a HyperText Markup Language (HTML) format; and including the at least one BI dashboard in a main body of the email.

6. The method of claim 1, wherein publishing the at least one BI dashboard further comprises storing, by the at least a third VBA macro, the at least one BI dashboard in a cloud storage location.

7. A system of a telecommunications network for publishing a Business Intelligence (BI) dashboard that includes a status of a project of a service provider of the telecommunications network, the system comprising:

at least one hardware processor; and at least one non-transitory memory storing instructions, which, when executed by the at least one hardware processor, cause the system to:

initiate a first computer script stored in a non-transitory, computer-readable storage medium, wherein the first computer script is configured to query at least one database of a software defect-tracking tool regarding a status of a software defect, and wherein the first computer script is configured to export a result of the query to a spreadsheet;

process, using at least one spreadsheet formula, a first Visual Basic Application (VBA) macro, a second computer script, or any combination thereof, the result of the query exported to the spreadsheet, wherein processing the result of the query exported to the spreadsheet includes representing the result as at least one table, at least one chart, at least one graph, or any combination thereof;

create at least one BI dashboard, wherein creating the at least one BI dashboard comprises initiating at least a second VBA macro stored in a non-transitory, computer-readable storage medium, wherein the at least a second VBA macro is configured to open a template of a slide presentation and enter the at least one table, at least one chart, at least one graph, or any combination thereof into at least one slide of the presentation, wherein the at least a second VBA macro is configured to predict a future status of a project of the telecommunications network by performing a predictive analysis, wherein performing the predictive analysis comprises creating a software defect burndown chart, wherein creating the software defect burndown chart comprises calculating a rate at which software defects were resolved in at least one preceding month and dividing a sum of a count of remaining software defects and a count of new software defects created in a current month by the calculated rate, wherein the at least a second VBA macro is configured to initiate at least a third VBA macro, and wherein the at least a third VBA macro is configured to save the at least one BI dashboard to a non-transitory, computer-readable storage medium;

publish the at least one BI dashboard, wherein publishing the at least one BI dashboard comprises initiating at least a fourth VBA macro, wherein the at least a fourth VBA macro is configured to compose at least one email based on an email template and include the at least one BI dashboard as at least one attachment in the email, and wherein the at least a fourth VBA macro is configured to send the email to at least one recipient.

8. The system of claim 7, wherein the software defect-tracking tool is JIRA and wherein the first computer script is configured to query the software defect-tracking tool in JIRA Query Language (JQL).

9. The system of claim 7, wherein the first computer script is configured to query the software defect-tracking tool in at least one recursive loop, wherein, within the at least one recursive loop, a unique subset of the result of the query is exported to the spreadsheet, and wherein the unique subset of the result is 50 to 10,000 rows long.

10. The system of claim 7, wherein the first computer script is configured to include at least one date check to prevent the first computer script from running more than once in a day.

11. The system of claim 7, wherein publishing the at least one BI dashboard further comprises causing the system to:

convert, by the at least a fourth VBA macro, the at least one BI dashboard into a HyperText Markup Language (HTML) format; and include the at least one BI dashboard in a main body of the email.

12. The system of claim 7, wherein publishing the at least one BI dashboard further comprises causing the system to:

store, by the at least a third VBA macro, the at least one BI dashboard in a cloud storage location.

13. A non-transitory, computer-readable storage medium comprising instructions recorded thereon, wherein the instructions, when executed by at least one data processor of a system of a telecommunications network, cause the system to:

initiate a first computer script stored in a non-transitory, computer-readable storage medium, wherein the first computer script is configured to query at least one database of a software defect-tracking tool regarding a status of a software defect, and wherein the first computer script is configured to export a result of the query to a spreadsheet;

process the result of the query exported to the spreadsheet, wherein processing the result of the query exported to the spreadsheet includes representing the result as at least one table, at least one chart, at least one graph, or any combination thereof;

create at least one Business Intelligence (BI) dashboard, wherein creating the at least one BI dashboard comprises initiating at least a second computer script stored in a non-transitory, computer-readable storage medium, wherein the at least a second computer script is configured to open a template of a slide presentation and enter the at least one table, at least one chart, at least one graph, or any combination thereof into at least one slide of the presentation, wherein the at least a second computer script is configured to predict a future status of a project of the telecommunications network by performing a predictive analysis, wherein performing the predictive analysis comprises creating a software defect burndown chart, wherein creating the software defect burndown chart comprises calculating a rate at which software defects were resolved in at least one preceding month and dividing a sum of a count of remaining software defects and a count of new software defects created in a current month by the calculated rate, wherein the at least a second computer script is configured to initiate at least a third computer script, and wherein the at least a third computer script is configured to save the at least one BI dashboard to a non-transitory, computer-readable storage medium;

publish the at least one BI dashboard, wherein publishing the at least one BI dashboard comprises initiating at least a fourth computer script, wherein the at least a fourth computer script is configured to compose at least one email based on an email template and include the at least one BI dashboard as at least one attachment in the email, and wherein the at least a fourth computer script is configured to send the email to at least one recipient.

14. The non-transitory, computer-readable storage medium of claim 13, wherein the first computer script is configured to query the software defect-tracking tool in at least one recursive loop, wherein, within the at least one recursive loop, a unique subset of the result of the query is exported to the spreadsheet, and wherein the unique subset of the result is 50 to 10,000 rows long.

15. The non-transitory, computer-readable storage medium of claim 13, wherein the first computer script is configured to include at least one date check to prevent the first computer script from running more than once in a day.

16. The non-transitory, computer-readable storage medium of claim 13, wherein publishing the at least one BI dashboard further comprises causing the system to:

convert, by the at least a fourth computer script, the at least one BI dashboard into a HyperText Markup Language (HTML) format; and include the at least one BI dashboard in a main body of the email.

17. The non-transitory, computer-readable storage medium of claim 13, wherein publishing the at least one BI dashboard further comprises causing the system to:

store, by the at least a third computer script, the at least one BI dashboard in a cloud storage location.

* * * * *